United States Patent [19]
Ludwig et al.

[11] Patent Number: 5,474,384
[45] Date of Patent: Dec. 12, 1995

[54] SUPPORTING BEARING FOR LINEARLY GUIDED TRAVELLING UNITS

[75] Inventors: Peter Ludwig, Tübingen; Johannes Koban, Stuttgart, both of Germany

[73] Assignee: Robert Bosch GmbH, Stuttgart, Germany

[21] Appl. No.: 360,836

[22] PCT Filed: Apr. 15, 1994

[86] PCT No.: PCT/DE94/00417

§ 371 Date: Jan. 3, 1995

§ 102(e) Date: Jan. 3, 1995

[87] PCT Pub. No.: WO94/25767

PCT Pub. Date: Nov. 10, 1994

[30] Foreign Application Priority Data

May 4, 1993 [DE] Germany .................. 43 14 658.9

[51] Int. Cl.⁶ .................. F16C 29/04; F16C 29/12
[52] U.S. Cl. .................. 384/57; 384/58
[58] Field of Search .................. 384/50, 57, 58

[56] References Cited

U.S. PATENT DOCUMENTS

| | | | |
|---|---|---|---|
| 2,554,299 | 5/1951 | Hammond | 384/57 |
| 3,504,952 | 4/1970 | Farmer | 384/57 |
| 4,715,730 | 12/1987 | Magnuson | 384/57 X |
| 5,070,575 | 12/1991 | Redman et al. | 16/96 R |
| 5,340,247 | 8/1994 | Cuneo et al. | 384/58 X |

FOREIGN PATENT DOCUMENTS

| | | |
|---|---|---|
| 0517951 | 12/1992 | European Pat. Off. . |
| 3329151 | 2/1985 | Germany . |
| 9016625 | 2/1991 | Germany . |

*Primary Examiner*—Thomas R. Hannon
*Attorney, Agent, or Firm*—Spencer, Frank & Schneider

[57] ABSTRACT

A supporting bearing (17) for linearly guided travelling units, having a housing and having a roller (20) which contains a rolling-contact bearing (26) and is seated on an eccentric bolt (28) which is mounted rotatably in the housing and can be fixed by clamping bolts (27). The housing (18a, 18b) is composed of two housing halves (18a, 18b) which are preferably of the same construction. The axial position of the roller (20) is determined by inner wall regions (46) of the housing halves (18a, 18b), which are laid or pressed against the end sides of the inner raceway (27) of the roller (20) after radial adjustment of the roller (20), by clamping the housing halves (18a, 18b) together. This results in the axial position of the roller (20) being fixed directly by way of its inner raceway (27).

8 Claims, 3 Drawing Sheets

5,474,384

SUPPORTING BEARING FOR LINEARLY GUIDED TRAVELLING UNITS

PRIOR ART

The invention takes as its departure point a supporting bearing for linearly guided travelling units in accordance with the generic type of the main claim. In the case of supporting bearings of this generic type, which are used, in particular, in modular linear-guidance systems in industrial manufacturing and themselves form a module for such a system, which can be designed individually, the axial play of the roller, as well as the radial guidance play thereof, has to be eliminated before start-up of the travelling unit if the means for guiding the travelling unit are to be operated satisfactorily even after a relatively long operating period. In the case of known supporting bearings of the generic type, the housing is configured rigidly in one part and is provided, in order to receive the roller, with a cutout which is open towards one housing side and of which the two side walls at right angles with respect to the axis of the roller are spaced apart from one another by a non-changeable spacing which, due to the unavoidable manufacturing tolerances on the housing and the roller, usually results in axial play of the roller. In order to eliminate this, provision is made for a screw which is guided in the housing and butts, on a wedge surface, on the eccentric bolt and, by way of said surface, presses the eccentric bolt axially onto a fixed stop surface. In spite of the resulting fixing of the eccentric bolt, it is not ensured that the axial position of the rollers also remains unchanged because the latter may possibly also be displaced on the eccentric bolt in the event of relatively high axial forces occurring.

ADVANTAGES OF THE INVENTION

The arrangement, according to the invention, having the characterizing features of the main claim has the advantage that the axial position of the roller is fixed directly by way of its inner raceway and the eccentric bolt does not require an axial clamping surface. The two housing halves may be of the same construction, as a result of which the number of items manufactured is increased and production is rendered less expensive. The two bearing pins on the eccentric bolt may have the same diameter, with the result that, if appropriate, re-machining of the bearing bores in housing halves of the same construction is also dispensed with.

The features cited in the subclaims constitute advantageous developments of the arrangement according to the main claim.

In the case of a preferred embodiment, the housing halves can be clamped together by the screws serving to fasten the supporting bearing on the basic body of the travelling unit and are configured and/or dimensioned such that, at least on one housing half, the inner wall region located opposite the inner raceway of the roller is deformed inwards upon tightening of the screws by the torque prescribed for the final assembly. Consequently, the axial position of the roller is automatically fixed, without additional measures and means, upon fastening the supporting bearing on the basic body of the travelling unit. Here, the arrangement may advantageously be such that deformation of the housing, eliminating the axial play, only takes place when the fastening screws of the supporting bearing are tightened to a greater extent than is necessary for fixing the supporting bearing on the basic body, during radial adjustment of the rollers and subsequently fixing of the eccentric bolt in the adjusted position.

The radial adjustment of the roller takes place, in this case, in a pre-assembly operation, while the axial play is eliminated during the following final-assembly operation.

The features cited in claims 3, 4 and 5 give a configuration, appropriate for manufacturing, of a supporting-bearing housing composed of two halves of the same construction.

In the case of supporting bearings having at least one dirt scraper which serves at the same time for lubrication purposes, consists of felt and is mounted in a displaceable and spring-loaded manner in a guide shaft of the housing, it is proposed that the dirt scraper be provided with border shoulders which, interacting with mating shoulders on the housing, prevent undesired escape of the dirt scraper out of the guide shaft. This results in the fact that, during storage and/or transportation of supporting bearings, specific measures against the dirt scraper falling out are dispensed with.

For a facilitated attachment of the supporting bearing on basic bodies which are provided with grooves for receiving fastening means, such as hammer nuts, the supporting-bearing housing is advantageously provided, on the assembly surface, with holes for plugging in guide elements which serve for the initial adjustment of the supporting bearing on the basic body and fit into the grooves.

DRAWING

An exemplary embodiment of the invention is explained in more detail in the following description and represented in the drawing, in which:

FIG. 1 shows a side view of a linear guide with a travelling unit designed as a carriage, FIG. 2 shows a supporting bearing of the travelling unit in the direction of arrow A in FIG. 1, FIG. 3 shows, on an enlarged scale, a section through the two loosely attached housing halves of the supporting bearing, along the line III—III in FIG. 2, and FIGS. 4 to 6 show, likewise on an enlarged scale, sections through the pre-assembled, but not yet attached supporting bearing, along the lines IV—IV, V—V and VI—VI in FIG. 2.

DESCRIPTION OF THE EXEMPLARY EMBODIMENT

Figure 1:
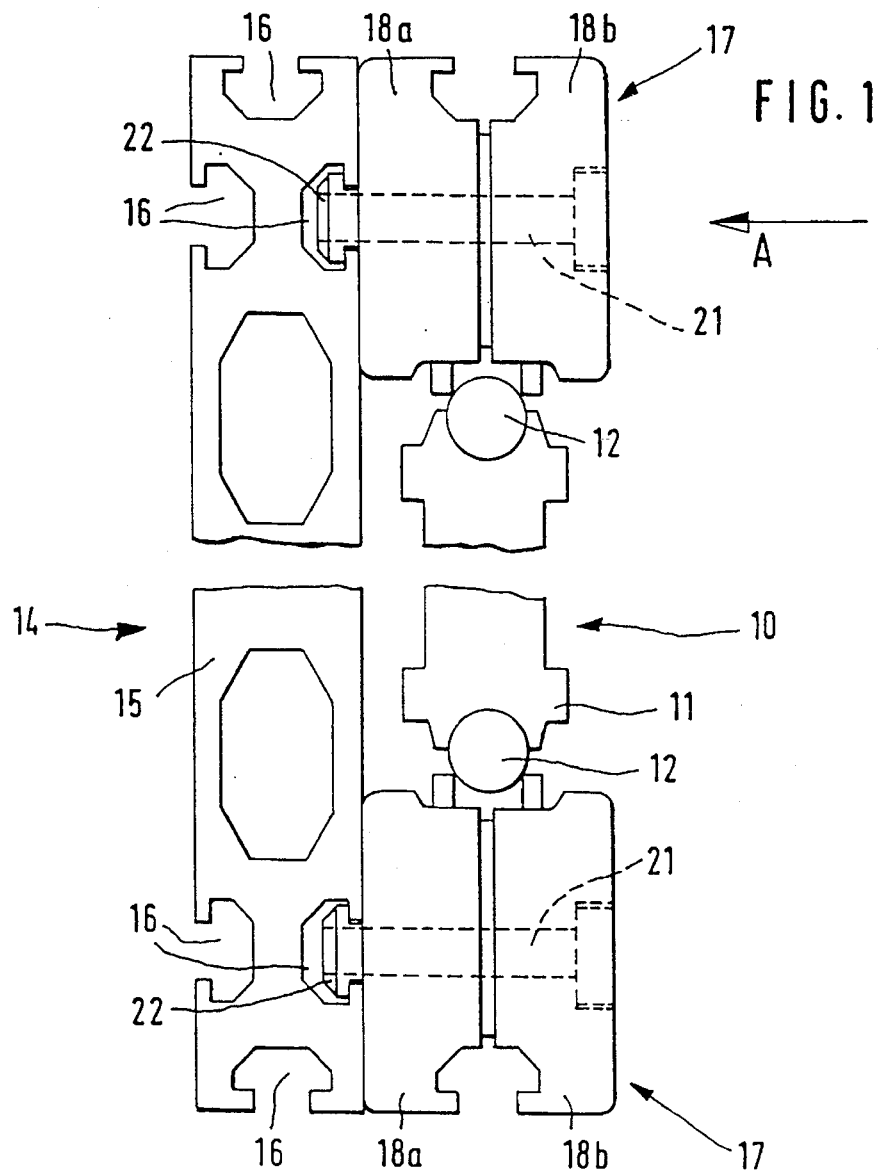
Figure 2:
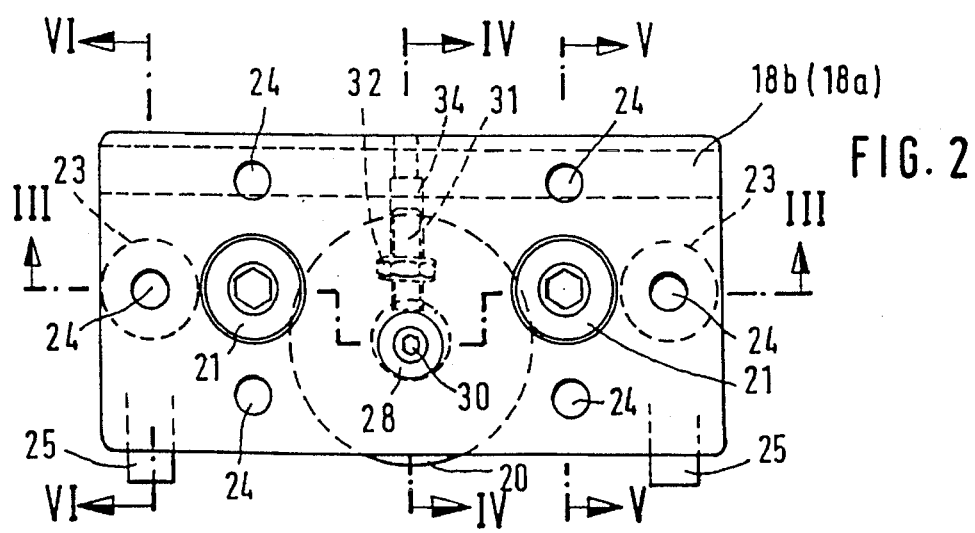

The linear guide has a fixed guide rail 10 which is composed of an extruded profile 11 and of two steel running rails 12 which are fastened on the extruded profile 11 in a suitable manner. The travelling unit, which is designated as a whole by the reference numeral 14 and is designed as a carriage, has, as basic body, a supporting plate 15 which is formed by an extruded profile and is provided with longitudinally running grooves 16 for receiving assembly elements for further components and component groups of the linear guide. Fastened on that side of the supporting plate 15 which is directed towards the guide rail 10 are four supporting bearings 17, of which, in the side view according to FIG. 1, in each case two lie congruently one behind the other. The supporting bearings 17 are designed as standardized modules of a modular construction system for linear guides which are suitable for attachment onto different travelling-unit basic bodies which are adapted to the relevant application purpose.

Each supporting bearing 17 has a housing which is composed of two housing halves 18a and 18b of the same construction and in which there is rotatably mounted a roller 20 which butts against the guide rail 10. Each supporting bearing 18a is fastened on the supporting plate 15 by two screws 21 and two hammer nuts 22 which engage into a groove 16 in the supporting plate 15 and also clamp the two housing halves 18a, 18b together. For the facilitated pushing of the supporting bearing 17 onto the supporting plate 15, and preliminary adjustment thereof, the housing half 18a is provided with two guide pins 23 which consist of an elastic material, are plugged into blind bores 24 in the housing half 18a and fit into the introduction opening of the corresponding groove 16. Each supporting bearing 17 is further provided with two dirt scrapers 25 which consist of felt and, in the manner described in more detail hereinbelow, are guided in the housing 18a, 18b and pressed against the guide rail 10 (the dirt scrapers 25 are not shown in FIG. 1).

Each roller 20 has a rolling-contact bearing 26, of which the inner raceway 27 is seated on an eccentric bolt 28 which is mounted rotatably in corresponding bearing bores 29 in the two housing halves 18a, 18b. By way of the eccentric bolt, the spacing of the roller 20 with respect to the guide rail 10 can be adjusted, for which purpose the eccentric bolt 28 is provided, on one end side, with attachment surfaces 30 for a screwdriver. In order to fix the eccentric bolt 28 in the adjusted position, use is made of a threaded stud 31 which engages into the thread of a hexagon nut 32, fixed without play in one housing half 18a, and presses radially against the eccentric bolt 28 in the region of the bearing bore 29. The operating-side end portion 33 of the threaded stud 31 is located in an outwardly open cutout 34 of the housing half 18a, whereas the hexagon nut 32 is fitted in a pocket formed on the inner side of the housing half 18a.

Figure 3:
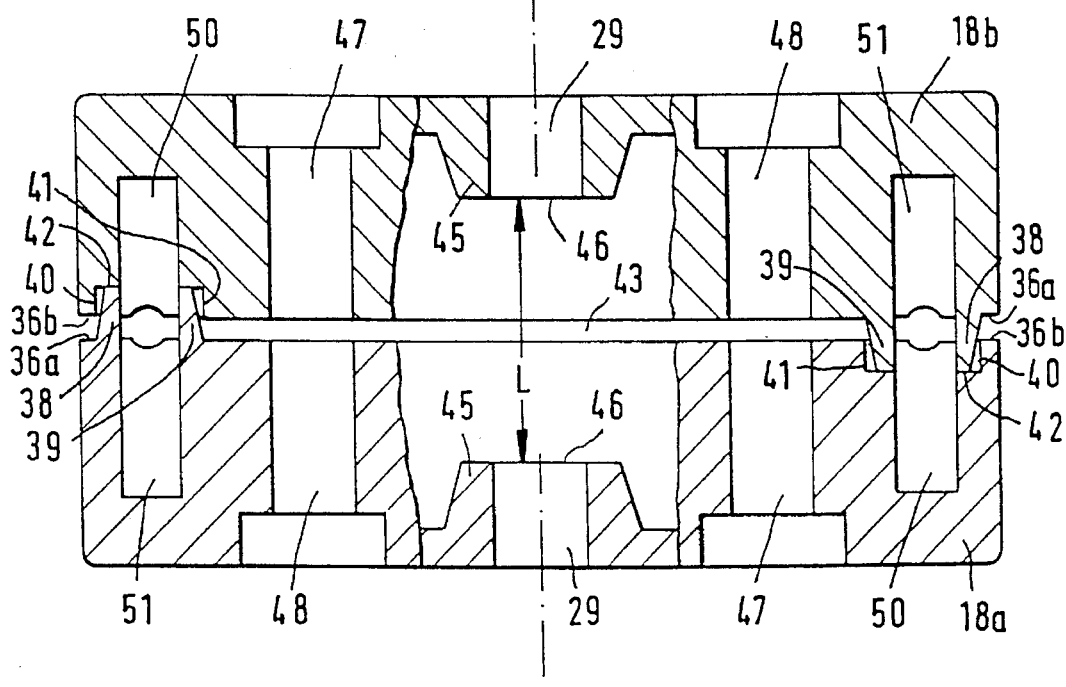
Figure 4:
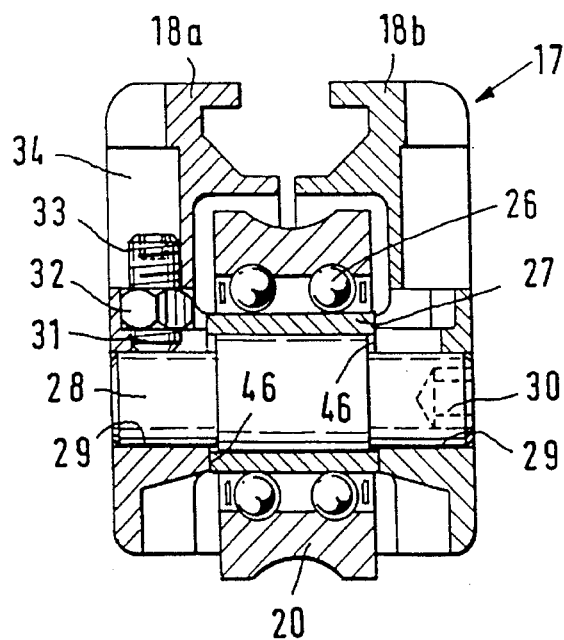

The two housing halves 18a, 18b, which have the same construction and are attached in a mirror-inverted manner (FIG. 3), are designed such that they bear directly one upon the other only on their relatively narrow side borders 36a, 36b. For this purpose, each housing half 18a, 18b is provided, on one side border 36a, with two elevated bearing strips 38, 39 which fit between shoulders 40, 41 and thus center the housing halves 18a, 18b with respect to one another, said shoulders being formed on the other side border 36b on the transition to a lower-lying wall portion 42. This results in a gap 43 being present between the two housing halves 18a, 18b, said gap extending from one side-border pair 36a, 36b to the other side-border pair 36b, 36a.

The bearing bores 29 for the eccentric bolt 28 are surrounded by collar-like extensions 45 of the housing halves 18a, 18b, of which the mutually facing stop surfaces 46, when the housing halves 18a, 18b are bearing one upon the other in a non-braced state, are spaced apart from one another by a spacing L which corresponds at least to the length of the inner raceway of the roller 20 plus a small amount of play which is required for the adjustment of the radial position of the roller 20. For the accommodation and through-passage of the screws 21, the housing halves 18a, 18b have stepped bores 47, 48 which are arranged between the side borders 36a, 36b and the center plane 49, of the housing 18a, 18b, which passes through the bearing bores 29.

The housing halves 18a, 18b are further provided with cutouts 50, 51 which, located opposite one another in pairs, form in each case one shaft for guiding a dirt scraper 25. Acting on each dirt scraper 25 is a compression spring 52 which is supported on the housing 18a, 18b via a ball 53 and pushes the dirt scraper 25 outwards. Each dirt scraper 25 has two border shoulders 54, 55 which, interacting with mating shoulders 56, 57 on the housing 18a, 18b, delimit the displacement path towards the outside.

Figure 5:
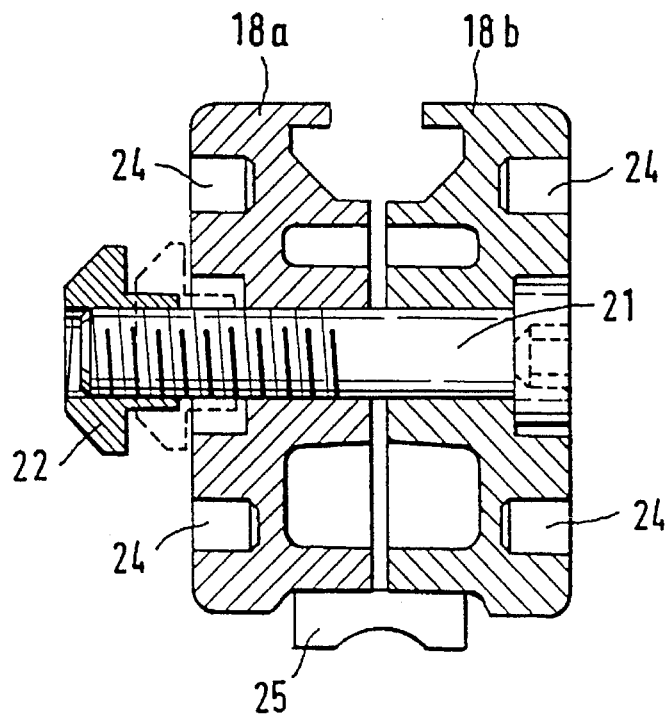
Figure 6:
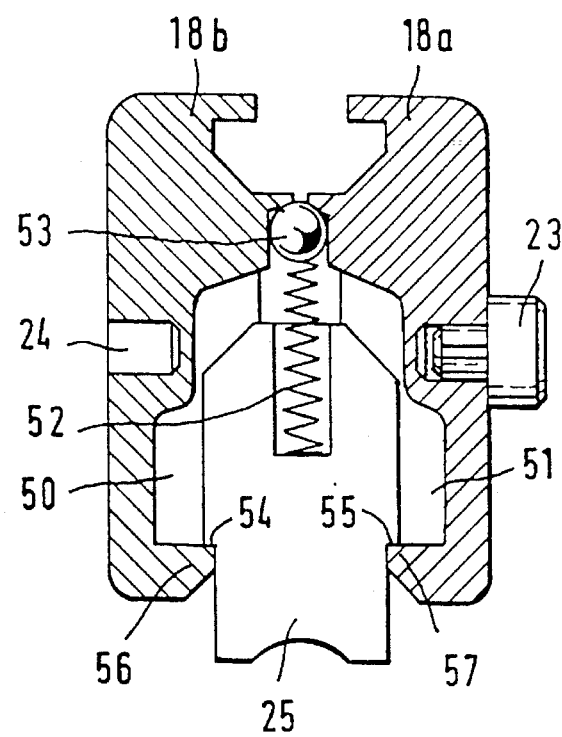

For the purposes of storage and delivery to the location of final assembly, the individual parts of a supporting bearing 17 can be loosely held together by the screws 21 and the hammer nuts 22 if these, as shown in FIG. 5, are screwed well enough onto the screws 21.

Upon assembly of the travelling unit 14 and play-free adaptation to the guide rail 10, the screws 21, after attachment of the supporting bearing 17 onto the supporting plate 15, are first of all tightened only to the extent where the supporting bearings 17 are fixed in a captive manner, but there is no obstruction to radial adjustment of the rollers 20 due to deformation of the housing half 18b which may, for example, already have occurred. After fixing of the eccentric bolt 28 by the threaded stud 31, the screws 21 are tightened by the full torque prescribed for final assembly, the housing half 18b, supported on the lateral bearing strips 38, 39 being deformed inwards by all of its inner region until its stop surface 46 comes to lie against the inner raceway 27 or presses against the same with a predetermined force. The arrangement could also be such that the extension 45 bearing the stop surface 46 is thereby deformed to some extent.

We claim:

1. Supporting bearing for linearly guided travelling units, having a housing which can be fastened on a basic body of the travelling unit by means of screws, and having at least one roller which contains a rolling-contact bearing and of which the inner raceway is seated on an eccentric bolt which is mounted rotatably in the housing for radial adjustment of the roller and can be fixed in the adjusted position by clamping means, and further having means for eliminating the axial play and/or for fixing the axial position of the roller in the housing, characterized in that the housing of the supporting bearing (17) is divided, transversely with respect to the axis of the roller (20), into two housing halves (18a, 18b) which are each provided with a bearing bore (29) for the eccentric bolts (28), and in that the axial position of the roller (20) is fixed by inner wall regions (46) of the housing halves (18a, 18b), which are laid or pressed against the end sides of the inner raceway (27) of the roller (20) after radial adjustment of the roller (20), by clamping the housing halves (18a, 18b) together.

2. Supporting bearing according to claim 1, characterized in that the two housing halves (18a, 18b) are of the same construction.

3. Supporting bearing according to claim 1 or 2, characterized in that the housing halves (18a, 18b) can be clamped together by the fastening screws (21) serving to fasten the supporting bearing (17) on the basic body (15) of the travelling unit (14), and are configured and/or dimensioned such that, at least on one housing half (18a, 18b), the inner wall region (46) located opposite the inner raceway (24) of the roller (20) is deformed inwards upon tightening of the screws (21) by the torque prescribed for the final assembly.

4. Supporting bearing according to claim 3, characterized by the following features:
   a) the two housing halves (18a, 18b) are configured such that they butt directly against one another only on two opposite side borders (36a, 36b),
   b) the through-passage bores (47, 48) which are provided in the housing halves (18a, 18b) and are intended for the fastening screws (21) are arranged between the bearing bores (29) and the abutting side borders (36a, 36b),
   c) formed on each housing half (18a, 18b) is a stop surface (46) which surrounds the inner opening of the bearing bore (29) and of which the mutual axial spacing (L), when the housing halves (18a, 18b) are butting against one another in a non-braced state, corresponds at least to the length of the inner raceway (27) of the roller (20) plus an amount of play which permits rotation of the eccentric bolt (28).

5. Supporting bearing according to claim 4, characterized in that the stop surfaces (46) which surround the inner openings of the bearing bores (29) are formed on collar-like extensions (45) of the housing halves (18a, 18b).

6. Supporting bearing according to claim 1, characterized in that in order to fix the eccentric bolt (28) in the adjusted position there is provided a bracing screw (31), of which the operating-side end portion (33) is located in an outer cutout (34) of one housing half (18a) and which is rotatably mounted in a nut (32) which is retained in an inner cutout of the housing half (18a) such that it is secured with respect to rotation and axial displacement.

7. Supporting bearing according to claim 1, having at least one dirt scraper which consists of felt and is mounted in a displaceable and spring-loaded manner in a guide shaft of the housing, characterized in that the dirt scraper (25) is provided with border shoulders (54, 55) which, interacting with mating shoulders (56, 57) on the housing (18a, 18b), prevent undesired escape of the dirt scraper (25) out of the guide shaft (50, 51).

8. Supporting bearing according to claim 1, for fastening on a basic body which is formed by an extruded profile and is provided with longitudinal grooves for receiving hammer nuts, characterized in that the housing (18a, 18b) of the supporting bearing (17) is provided, on the assembly surface, with holes (24) for plugging in guide elements (23) which serve to adjust the supporting bearing (17) on the basic body (15) and fit into the grooves (16).

* * * * *